(12) United States Patent
Moffitt (10) Patent No.: US 8,006,431 B2
(45) Date of Patent: *Aug. 30, 2011

(54) FISHING FLY AND METHOD OF FLY FISHING

(75) Inventor: Patrick E. Moffitt, Califon, NJ (US)

(73) Assignee: Moffitt Angling Limited, Tsimshatsui, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 12/020,199

(22) Filed: Jan. 25, 2008

(65) Prior Publication Data

US 2008/0115404 A1 May 22, 2008

Related U.S. Application Data

(60) Continuation of application No. 11/435,194, filed on May 16, 2006, now abandoned, which is a continuation of application No. 10/844,010, filed on May 12, 2004, now abandoned, which is a division of application No. 10/194,613, filed on Jul. 12, 2002, now Pat. No. 7,036,265.

(51) Int. Cl.
*A01K 85/00* (2006.01)

(52) U.S. Cl. ............... 43/42.24; 43/42.15; 43/42.11

(58) Field of Classification Search ............ 43/42.25, 43/42.15, 4.5, 42.24, 42.11, 42.22, 42.05
See application file for complete search history.

(56) References Cited

U.S. PATENT DOCUMENTS

| | | | |
|---|---|---|---|
| 633,797 A | | 9/1899 | Cantrell |
| 1,476,067 A | * | 12/1923 | Fredricks .............. 43/42.25 |
| 2,511,117 A | * | 6/1950 | Loeb .................... 43/42.37 |
| 3,500,574 A | * | 3/1970 | Putnam ................. 43/42.25 |
| 3,514,890 A | * | 6/1970 | Francklyn ............. 43/42.05 |
| 3,535,813 A | * | 10/1970 | Cordell, Jr. ........... 43/42.05 |
| 3,546,804 A | * | 12/1970 | Woolums ............. 43/42.11 |
| 3,740,891 A | | 6/1973 | Rubenstein |
| 3,747,254 A | * | 7/1973 | Caruso ................. 43/25.2 |
| 4,158,927 A | | 6/1979 | Capra et al. |
| 4,383,385 A | | 5/1983 | Myers |
| 4,777,760 A | | 10/1988 | Akaishi et al. |
| 4,794,721 A | * | 1/1989 | Rowe et al. ........... 43/42.14 |
| 4,823,502 A | * | 4/1989 | Tucker ................. 43/42.37 |

(Continued)

OTHER PUBLICATIONS

"Canadian Office Action dated Nov. 13, 2008 for Canadian Application No. 2,491,830", 2 pgs.

(Continued)

*Primary Examiner* — Christopher P Ellis (74) *Attorney, Agent, or Firm* — Diehl Servilla LLC; Glen M. Diehl (57) ABSTRACT

A fishing fly for catching a fish, comprising a folded rubber string core, one or more materials surrounding the folded rubber string core form a pattern representative of food available to the fish, and an eye formed by a continuous section of the folded rubber string core extending from the one or more materials is provided. The one or more materials may include thread, feathers, or beads. The core may alternatively be metal, plastic, or unfolded rubber. A method of fishing using the fishing fly is also provided. The method includes attaching a fly to a line containing a hook at one end, the fly being attached at some distance from the hook, placing the hook end of the line into a body of water to be fished, and retrieving one or more fish caught on the hook.

8 Claims, 12 Drawing Sheets

U.S. PATENT DOCUMENTS

| | | | | |
|---|---|---|---|---|
| 4,908,975 A | * | 3/1990 | Root et al. | 43/42.25 |
| 5,027,543 A | * | 7/1991 | Peterson | 43/42.25 |
| 5,063,704 A | * | 11/1991 | Phillips | 43/42.25 |
| 5,119,583 A | * | 6/1992 | Mason | 57/24 |
| 5,127,183 A | | 7/1992 | Wulff | |
| 5,327,670 A | * | 7/1994 | Tallerico | 43/42.14 |
| 5,617,668 A | | 4/1997 | Shimandle | |
| 6,185,857 B1 | * | 2/2001 | Hnizdor | 43/42.11 |
| 7,036,265 B2 | | 5/2006 | Moffitt | |
| 7,437,849 B2 | * | 10/2008 | Selvaggio | 43/42.05 |
| 2004/0006906 A1 | * | 1/2004 | Moffitt | 43/4.5 |
| 2006/0240233 A1 | * | 10/2006 | Chocklett et al. | 428/216 |

OTHER PUBLICATIONS

Supplementary European Search Report for Appln. No. 03764418.4, (Jul. 1, 2009), 4 pgs.

* cited by examiner

FISHING FLY AND METHOD OF FLY FISHING

This application is a continuation of U.S. application Ser. No. 11/435,194, filed May 16, 2006, which is a continuation of U.S. application Ser. No. 10/844,010, filed May 12, 2004, which is a divisional of U.S. application Ser. No. 10/194,613, filed Jul. 12, 2002, now U.S. Pat. No. 7,036,265, the contents of which are incorporated herein by reference.

BACKGROUND OF THE INVENTION

The present invention relates to fly-fishing apparatus and methods.

The popularity of fly-fishing has been increasing over the last twenty-five years. The growth in popularity has been accompanied by and, in part, driven by, advances in fly tying materials, rod and reel technology, and improved hook and line construction. The basic fly or lure presented to a fish, with the exception of sharper hooks and some synthetic tying materials, however, has not changed.

The bulk of flies used in angling are tied with natural feathers, fur or synthetic materials onto a variety of hook sizes and shapes with the purpose of imitating a fish's natural food items. These include, but are not limited to, aquatic nymphs, insects floating on top of the water, other fish, ova, and terrestrial animals. A fish is hooked when a fly, with its integral hook, is taken into the fish's mouth and the angler pulls back on the fly rod to "set the hook" in the fish's mouth.

The increase in popularity of fly-fishing has resulted in an increase in angling pressure on the fish, as more and more people fish waterways. The increase in angling pressure, however, has been mitigated, in part, by a new ethic that promotes the catch and release of fish. As a result, some state agencies have set aside waters that require all fish to be released unharmed. In such waterways, fish are often caught multiple times during the course of a season. Many believe that these fish learn to avoid cues associated with an angler presenting a fly as a result of being caught more than once.

The anecdotal belief that fish can become educated is supported by scientific research that demonstrates that fish can learn to avoid adverse situations, and this memory can last for more than a year. See, for example, J. W. Adron, P. T. Grant & C. B. Cowey, *A System for the Quantitative Study of the Learning Capacity of Rainbow Trout and its Application to the Study of Food Preferences and Behavior*, J. Fisheries Biol. 5:625-36 (1973) and Roger Young & John Hayes, *Does Increased Fishing Pressure Make Trout Harder To Catch?*" Cawthron Research News (January 2000), at 1. It is believed that the three most important negative cues to a fish are the exposed hook shape and the diameter and index of refraction of the line. It is believed that color and size of the fly are important but not as much as the factors outlined above.

Many anglers recognize some of these negative signals given to the fish by using too large a line diameter, improper fly speed (drag), and improper color and shape of flies. Anglers, in an effort to overcome these negative cues, at times utilize the lightest of lines and go to great lengths to match the size shape and color of a natural. Angling literature stresses that the difference of matching a 5 mm natural with a 6 mm imitation can be critical. Nowhere, however, has the impact of the exposed hook been discussed. The exposed hook for the commonly used size 12 fly is 30% of the area of the entire fly and 40% as large as the dressed (imitated) part of the fly. The vision of most fish is extremely acute and is especially true for trout. Adult trout routinely feed on food organisms as small 2 to 3 mm. The exposed hook length of a size 12 fly is 14 mm.

Doug Swisher & Carl Richards, Selective Trout 20-26 (Crown Publishing Group 1972), state that the wing shape of a floating fly is the first thing a trout sees and determines whether the fish will contemplate taking the fly. Using pictures therein, it is easy to infer that the first image a trout sees is the hook. Humans view flies and assess their viability on the shape size and color. Our intelligence allows us to eliminate the hook shape from consideration. Fish with lesser intellect see the entire object and cannot dismiss 30 to 40% of the mass.

Fish can be very selective at times in the choice of their preferred foods. Anglers continually change flies to find the constantly changing preferred food item and its imitation. Changing a fly by the current state of the art requires the line to be broken and a new fly tied on. Altering the flies on a line is time-consuming and cumbersome, and causes great frustration to those with poor eyesight or without the nimblest of fingers.

Some anglers in order to more quickly find the preferred food choice or to increase their statistical odds utilize two or more flies. As stated in *Fly Fish America*, (March 2002) pp. 20-23, "The use of two flies is not for everyone and does require more time to rig, dealing with tangles and hooking yourself every now and then." The second fly's hook tangling around the main line during the cast causes the problems, and the free-swinging fly presents a hazard to the angler's hand while trying to unhook a fish.

Further problems arising when using current integrated hooked flies include the size of the fly and/or the hook and the number of flies an angler must carry. Large flies are constructed on large hooks to provide for a sufficient gap between the hook point and the fly body needed to engage the fish's mouth. The large size of the exposed hook increases the probability that a fish will refuse the fly due to hook exposure. In many fisheries with small trout or smolt, large hooks can and do permanently injure these fish. Also, many of the light fly rods do not have a backbone that can structurally support setting large hooks in a fish. The problem is exacerbated when using light lines since the force needed to set a large hook may exceed the breaking strength of the line.

In addition, many alternative fly types are needed depending on the fish sought. As an example, beaded flies in a variety of weights and patterns have become popular. Current beaded fly production involves pushing the point of the hook through a hole in the bead and pushing the bead to the eye of the hook. The remainder of the fly is tied with the hook integrated as a permanent part of the fly. The angler must carry numerous fully tied flies to cover the range of beaded, non-beaded, weighted, and un-weighted flies as well as the different finishes.

In view of these considerations, new fishing flies are needed to help anglers in their quest for fish. Further, new methods of presenting fishing flies are also needed.

SUMMARY OF THE INVENTION

In accordance with one aspect of the present invention, the invention includes a fishing fly for catching a fish. The fishing fly includes a folded rubber string core, one or more materials surrounding the folded rubber string core, which materials form a pattern representative of food available to the fish, and an eye formed by a continuous section of the folded rubber string core extending from the materials.

Also included is a fishing fly such as the foregoing in which there is no hook attached to the fly.

Additionally, one aspect of the present invention allows the folded rubber string core of an aforementioned fly to flex laterally, allowing for close approximation of food movement by the fly in water.

Also included is a fishing fly such as the foregoing in which the materials used include thread, feathers, or beads.

The invention also includes a fishing fly for catching a fish in which the fishing fly contains a core with no hook and one or more materials surrounding a flexible core. The materials form a pattern representative of food available to the fish. It also includes an eye formed by an end section of the core extending from the materials.

Additionally included is a fishing fly as described where the core is metal.

The invention also includes a fishing fly as above having a plastic tube or rubber string as its core.

Additionally, the invention includes a fly-fishing rig for catching a fish that has a fly line having an end and a fly having a flexible core and no hook. The fly is attached to the fly line at a distance from the end of the fly line, and a hook is attached to the end of the fly line.

The invention also includes a method for attaching a fly to a line that has a hook at one end, and the fly is attached to the fishing line at a distance from the hook. The hook end of the line is placed into a body of water to be fished, and one or more fish caught on the hook are retrieved.

In addition, the invention includes a method where the fly sinks below the surface of the body of the water and a method where it floats on the surface.

Additionally, a method is included for attaching a fly to a line where a loop of line is threaded through an eye of the fly. The eye is a loop of material previously incorporated in the fly.

It is understood that both the foregoing general description and the following detailed description are exemplary and are intended to provide further explanation of the invention claimed.

The accompanying drawings, which are incorporated in and constitute part of this specification, are included to illustrate and provide a further understanding of the apparatus and method of the invention. Together with the description, the drawings serve to explain the principles of the invention.

DETAILED DESCRIPTION

In accordance with a preferred embodiment of the invention, apparatus and methods are provided for improved fly-fishing.

Advantageously, a fly-fishing fly that does not require the line to be disconnected to change or remove a fly is presented. The flies can be added, removed, or pushed up the leader without the need for new knots thus greatly speeding and simplifying the changing of flies.

Another advantage is that two or more flies can be fished without tangles and without the potential of the free-swinging fly hooking the angler or fouling in the landing net when landing a fish.

Another advantage of the current invention is that the learned aversion of fish to the hook shape and to objects that do not orient correctly with regard to the water current is overcome.

The current invention also advantageously provides a soft fly body, which leads to a longer retention time by a fish, enhancing strike detection and hookups. The ability of the angler to detect a strike before the fish has expelled it from its mouth is a major factor in success.

An additional advantage offered by the present invention is that the flies assume a more natural shape than hooked flies, which better mimic the movement of fish food prey items in water.

The invention also offers the advantage of the use of small hooks with large flies, which reduce the mortality rate of released fish and the ability to use lighter lines and rods.

Advantageously, the invention also allows for easy alteration of the fly from weighted to un-weighted and from beaded to non-beaded flies using the same basic fly form.

Another advantage of the current invention is that the invention greatly reduces the numbers and styles of hooks that need to be carried by a fisherman.

Figure 1:
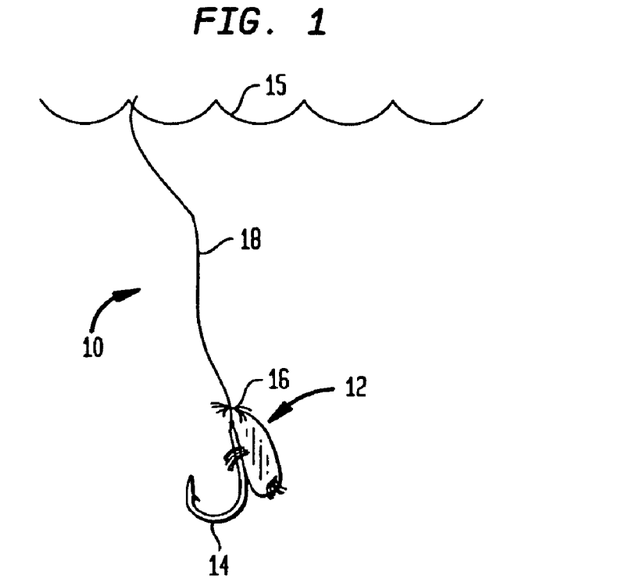
FIG. 1 illustrates a fly-fishing rig.

FIG. 1 shows an exemplary fly-fishing rig. A traditional fly rig 10 includes a fly 12 with an integral hook 14 connected at the end 16 of a fishing line 18. The hook 14 being an integral part of the fly 12 means that the fly 12 is constructed, or tied, around the hook. Fishing line 18 typically extends below and above (not depicted) the surface 15 of the body of water being fished.

Figure 2:
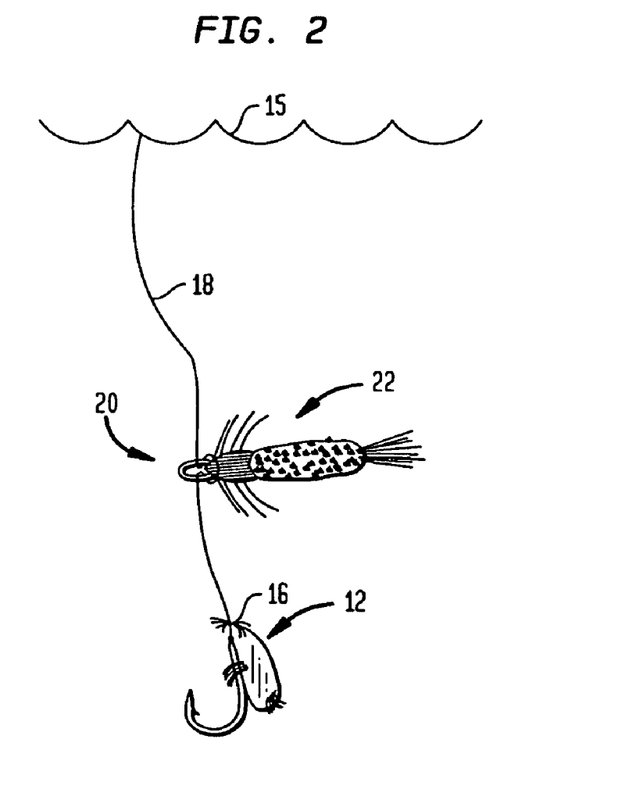
FIG. 2 illustrates a fly-fishing rig in accordance with one aspect of the present invention.
Figure 3:
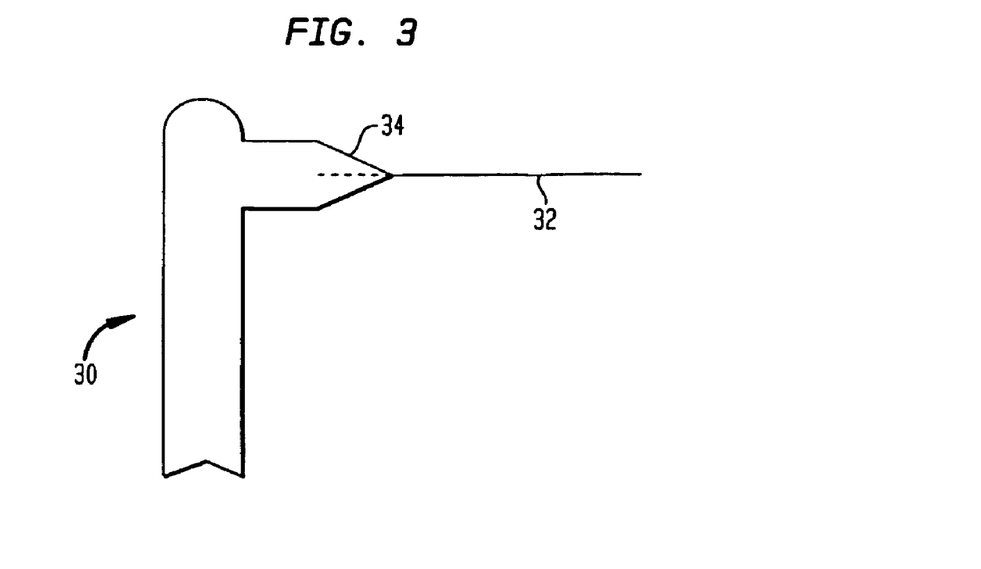
FIGS. 3 and 4 illustrate a fly being tied in accordance with one aspect of the present invention.
Figure 4:
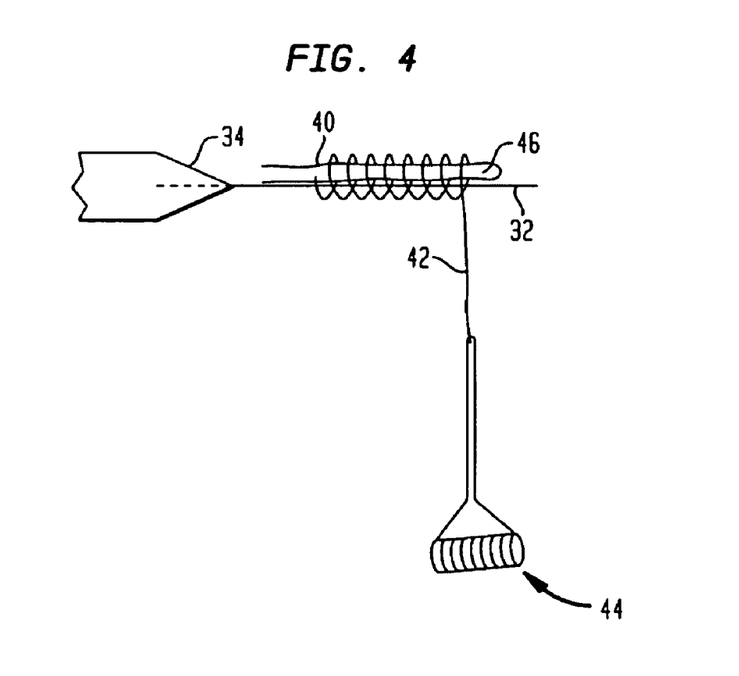

FIG. 2 illustrates a fly rig in accordance with one aspect of the present invention. The fly rig 20 includes a hookless fly 22 attached to a fishing line 18 some distance from the end 16 of the line 18. This distance may vary from a minimum of slightly greater than zero inches to several feet, depending on the type of fly employed and other factors. In a preferred embodiment, a hooked fly 12 can be attached to the end 16 of the line 18. The fishing line 18 may be of any number of materials such as nylon or fluorocarbon FIGS. 3 and 4 illustrate an exemplary process of tying hookless flies. Other well-known processes may be employed. The fly is not tied on a hook but instead is constructed using standard fly tying tools such as the fly tying vise 30 shown in FIG. 3. A pin 32 is inserted into the jaws 34 of the vise 30. In FIG. 4, a core material 40 is attached to the pin 32 by means of tying thread 42 from a thread spool 44. Various materials familiar to one skilled in the art may be used for tying thread. The core material 40 may be a variety of materials also. As an example, FIG. 4 shows a flexible rubber material used as a core material 40 folded onto itself in order to form an eye 46 during fly tying. The core may be surrounded by one or more materials that form a pattern representative of food available to the fish. These one or more materials include, by way of example only, beads, feathers, and threads. These materials are tied onto the fly in accordance with well known fly tying techniques. Of course other materials commonly used in fly tying can also be used.

Figure 5:
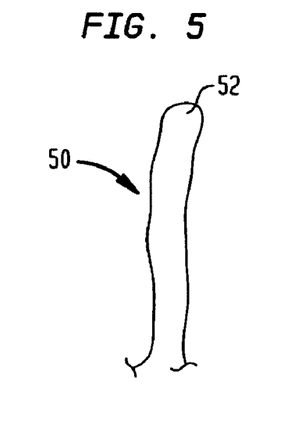
FIG. 5 illustrates a flexible rubber core having an eye formed as the material is folded onto itself and that can be used when tying a fly in accordance with another aspect of the present invention.
Figure 6:
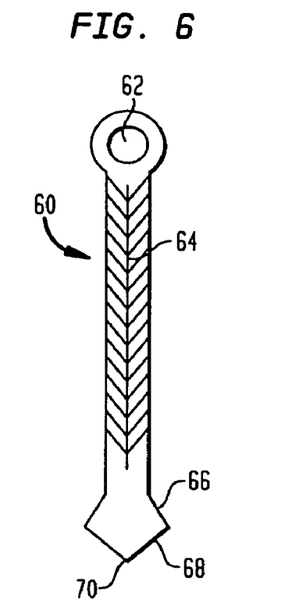
FIG. 6 illustrates a molded core having a preformed eye and a length-wise indentation that can be used when tying a fly in accordance with another aspect of the present invention.
Figure 7:
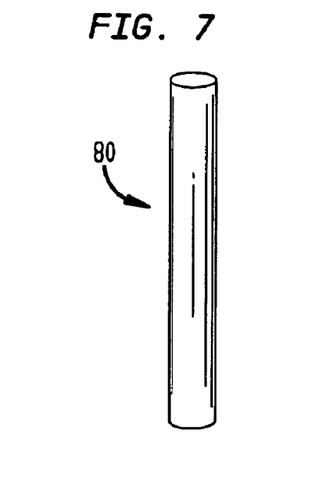
FIG. 7 illustrates a tube that can be used when tying a fly in accordance with another aspect of the present invention.

Although many materials may be used, FIGS. 5-7 showcase several types of core materials. Some core materials are rubbers, plastics, or metals in sheet, cord, tube, or molded form and may be rigid or flexible. In sheet or cord form, an eye is formed on one end of the fly in order to attach the line. The molded form has the eye already incorporated. FIG. 5 shows a flexible rubber core material 50, such as a rubber string, folded onto itself with an eye 52 formed by the folding. FIG. 6 shows a rigid, molded core 60 with a preformed eye 62 and an indentation 64 along its body. The molded core may also have a tailpiece that easily fits in standard tying vices and can be readily snapped off once the fly is tied. The molded core 60 may have a flared end 66 that tapers 68 near its termination 70. FIG. 7 depicts a tubular core. A tube 80 can be attached to a fishing line in numerous ways, some of which will be described below.

Additionally, the core does not need to be flexible, but still should not include a hook. It is, however, believed that an inflexible core could reduce the effectiveness of the fly due to the restricted movement. The smaller the fly, however, the less important the characteristic of flexibility is thought to be. Thus, it is believed that an inflexible material can also be used in the core.

Figure 8:
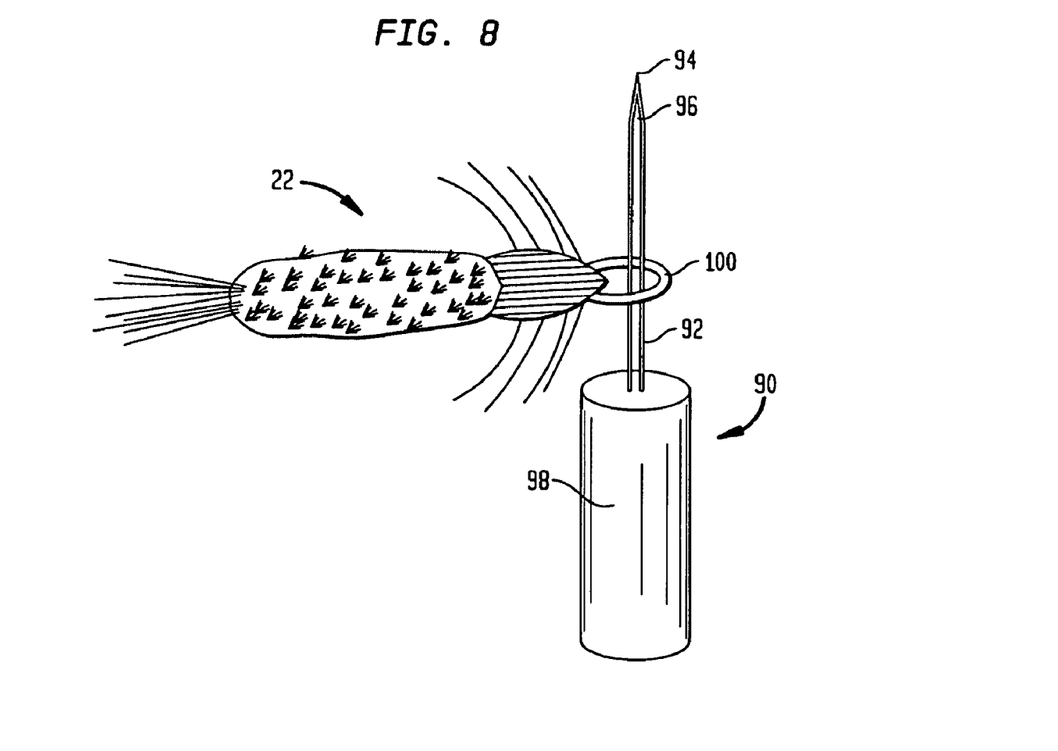
FIGS. 8 to 12 illustrate a preferred method of attaching the hookless fly of the present invention to a fishing line.
Figure 9:
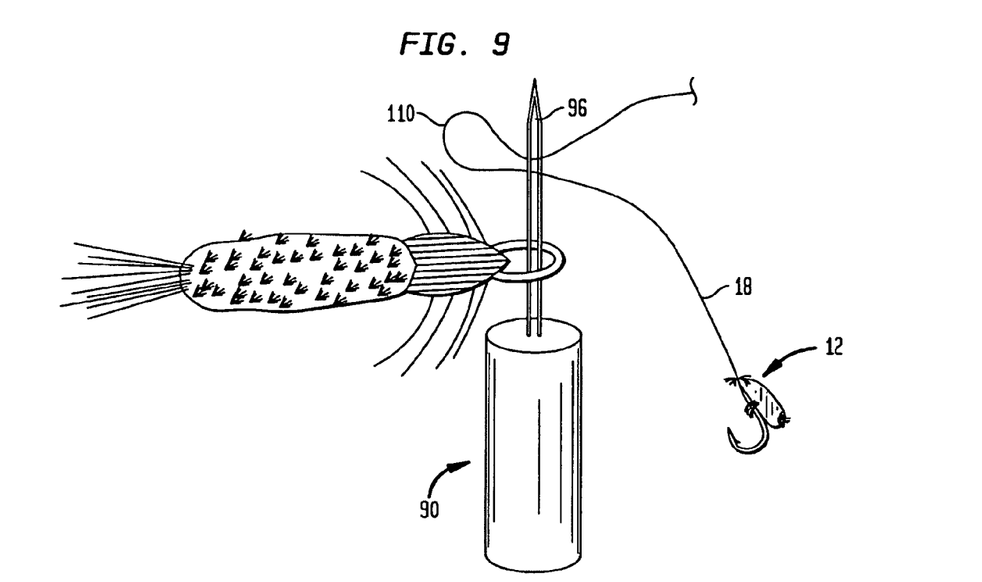
Figure 10:
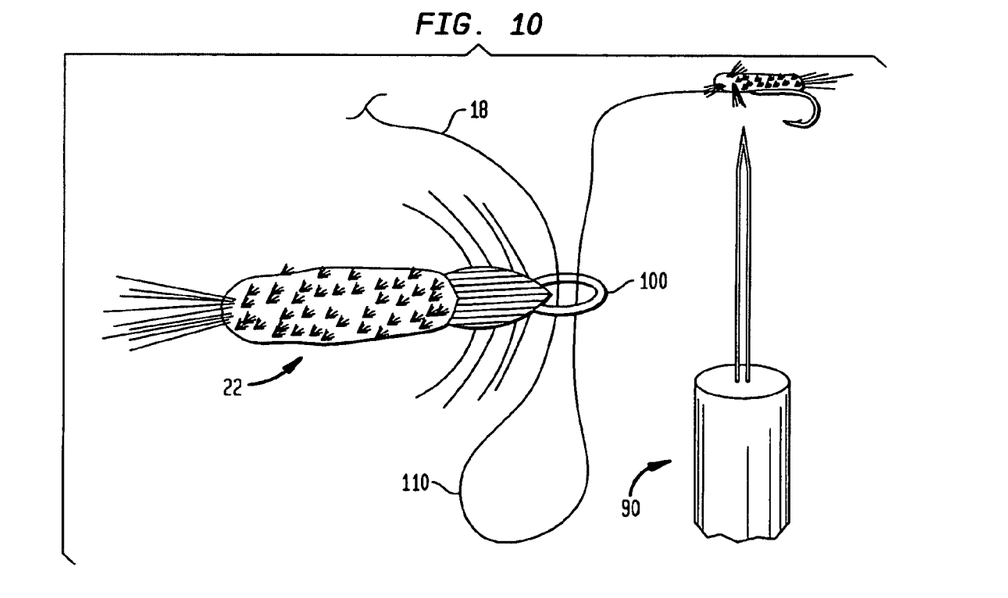
Figure 11:
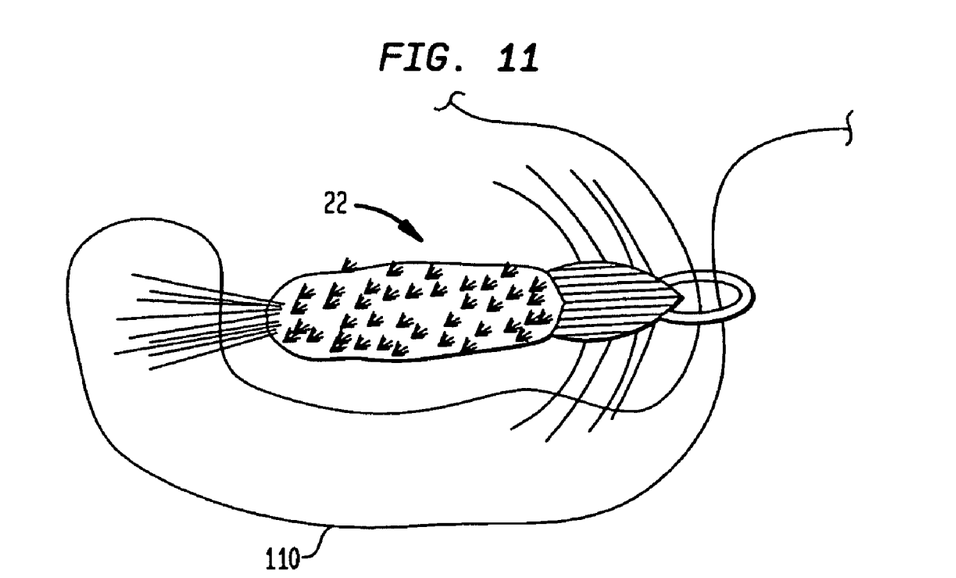
Figure 12:
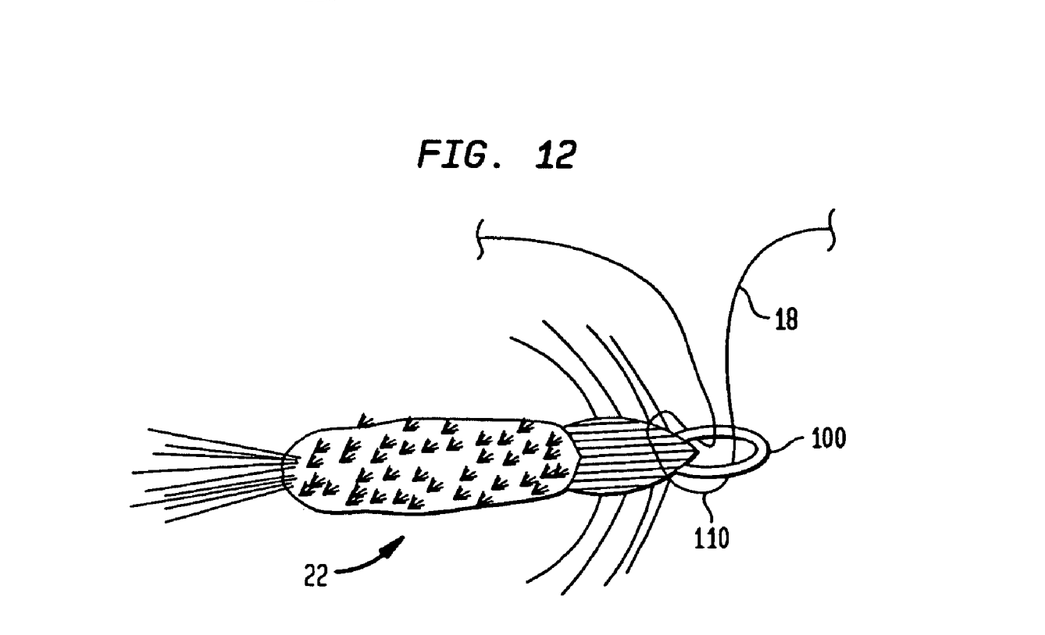

In a preferred embodiment, a finished fly with eye loop is attached to an angler's line by looping a fishing line through the eye loop of a fly and pulling the loop over the body of the fly. FIG. 8 is one embodiment that uses a threading tool to accomplish the attachment. The threading tool 90 consists of a fine wire 92 bent back on itself, forming a tip 94 and a closed wire loop 96, with both free ends of the wire embedded in a handhold 98. Such tools are common to one skilled the art. The tip 94 of the threading tool 90 is inserted and pushed through the eye 100 of a fly 22. As in FIG. 9, the fishing line 18 is terminated on one end by a hooked fly 12 and a rod (not shown) on the other. The fishing line 18 is inserted into wire loop 96 of the threading tool 90 until it protrudes, forming a loop 110 of fishing line 18. In FIG. 10, the threading tool 90 and loop 110 of fishing line 18 are pulled back through the eye 100 of the fly 22 until a loop 110 of fishing line 18 longer than the fly 22 is formed, and the threading tool 90 is removed from the eye 100. Following FIG. 11, the loop 110 is pulled over the body of the fly 22, and, as shown in FIG. 12, the loop 110 is pulled tight around the fly's 22 eye 100. Friction allows the fly 22 to remain stationary while fishing, but the position of the fly 22 along the line 18 may be adjusted by pulling on one leg of the line 18 while holding the fly 22.

Figure 13:
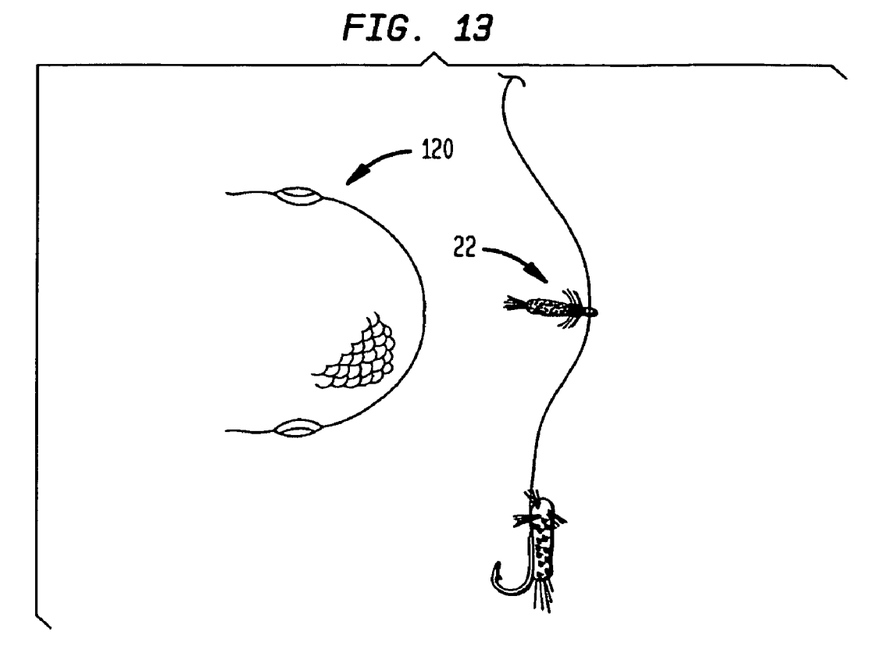
FIGS. 13 to 15 illustrate the approach of a fish to the fly-fishing rig of the present invention and a preferred method of hooking a fish.
Figure 14:
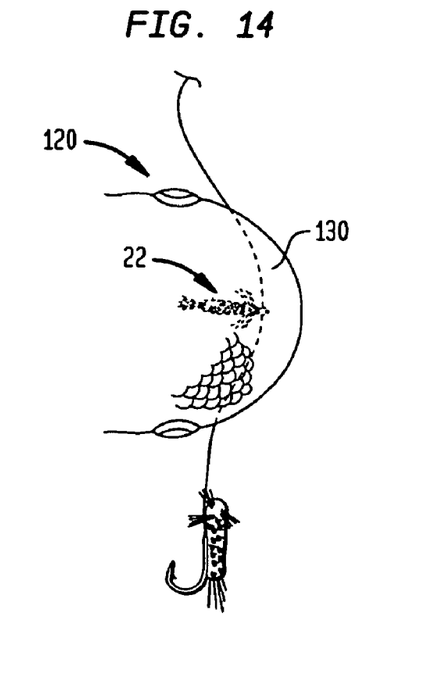
Figure 15A:
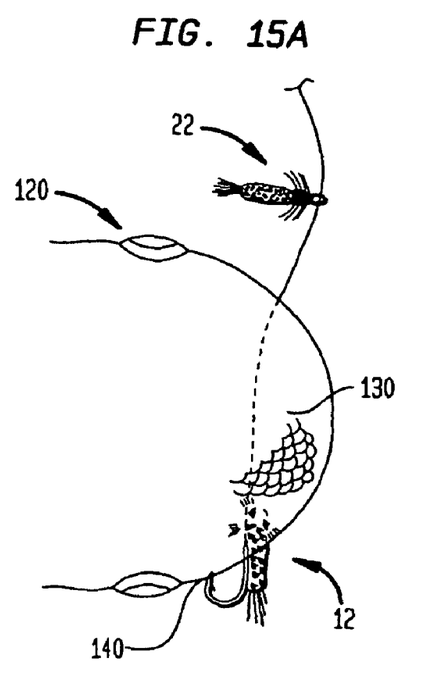
Figure 15B:
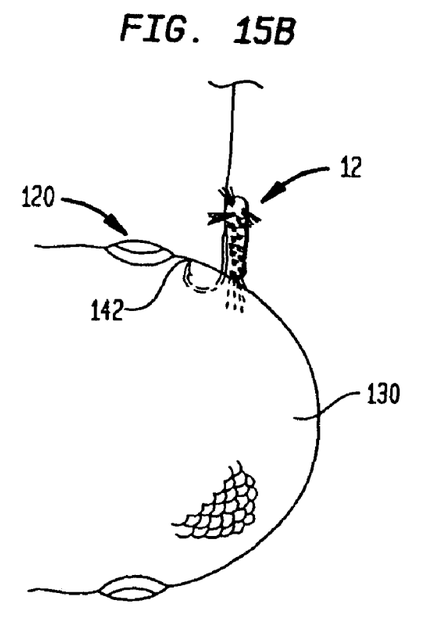

In traditional fly-fishing, a fish takes a fly with an integrated hook into its mouth, and an angler, sensing a take, pulls the line, which engages the hook in the fish's mouth. From FIG. 2, the inventive method provides for a hookless fly 22 some distance from a conventional hooked 12 or bare fly attached to the terminal end 16 of the line. FIG. 13 shows a fish 120 approaching hookless fly 22. As FIG. 14 depicts the fish 120 takes the fly 22 into its mouth 130. FIG. 15 demonstrates that as an angler, sensing a take, raises the fly rod, the hookless fly 22 is pulled through the fish's 120 mouth 130, driving the terminal (hooked) fly 12 into the fish's 120 mouth 130. Referring to FIGS. 15(a) and 15(b), respectively, the hooked fly (or bare hook) 12 sets into the exterior 140 or interior 142 part of the fish's 120 mouth 130.

Figure 16:
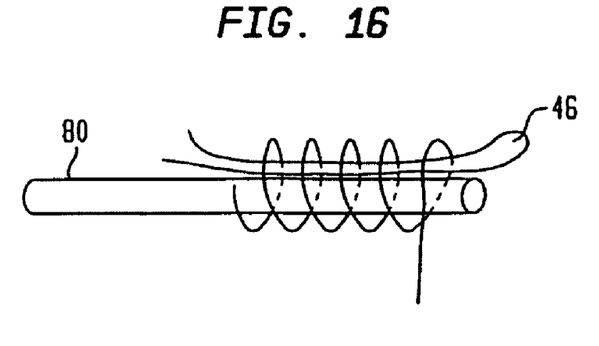
FIG. 16 illustrates a rubber loop attached to a tube while tying a fly in accordance with another aspect of the present invention.
Figure 17:
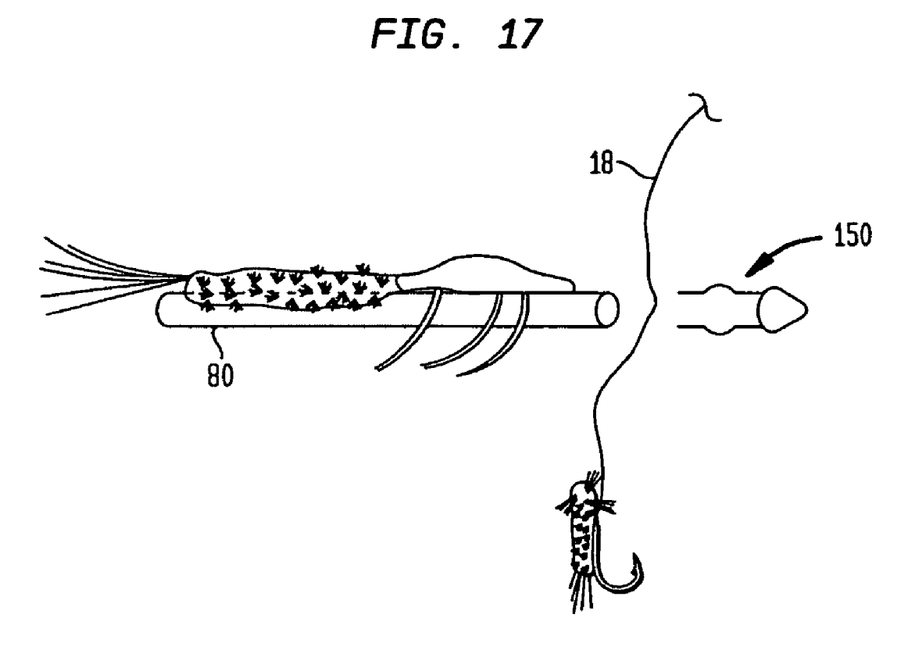
FIGS. 17 to 19 illustrates the attachment of a tube to a fishing line in accordance with a preferred embodiment of the present invention.
Figure 18:
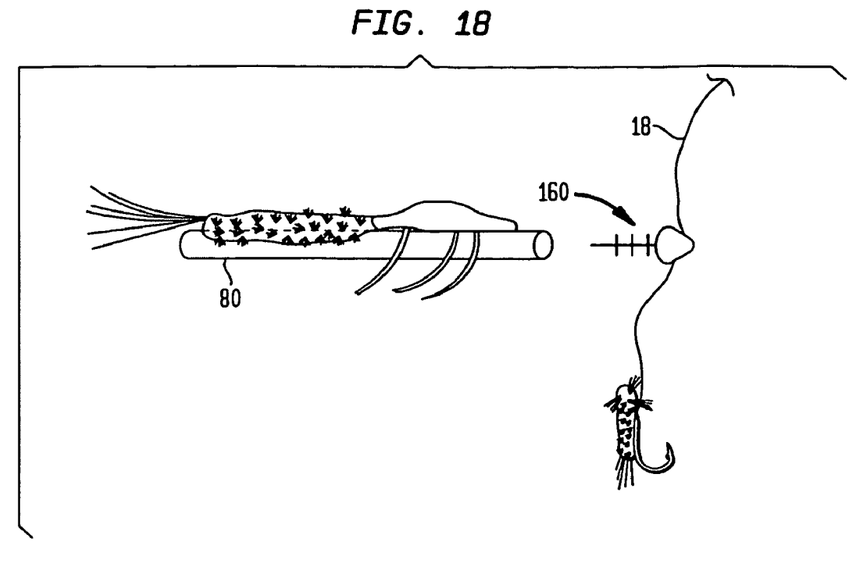
Figure 19:
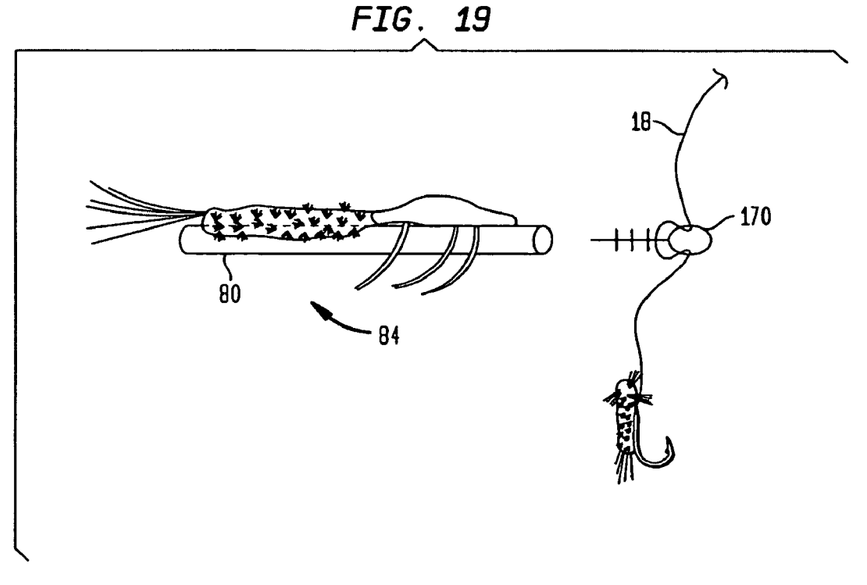

FIG. 16 shows a rubber loop attached to a tube. When a tube 80 is used as a core, a preferred embodiment contains an eye 46 that may be created as the fly is tied. Attachment to the line can be identical to the above process. FIG. 17 illustrates another embodiment where tube-containing flies with or without an eye may be attached to a line. An insert 150 can be used to attach a tube fly to a line 18. The tube 80 can be attached to the line 18 via a press-fit insert 150 whereby the line 18 is captured between the body of the insert 150 and the tube 80. FIG. 18 shows another embodiment where a tube 80 is attached to a line 18 using a crimp-based pin 160 pushed into the tube 80. FIG. 19 shows the use of an eye pin. An eye pin 170 may be inserted in a tube 80, and the fly 84 attached to the line 18 using the threading tool. Here, the fishing line 18 is directly attached to the eye pin 170 insert. The insert 150 can also be an eye loop or any other attachment device. The insert 150 may also be glued or press fit to the fly or tied onto the fly as an integral part of the fly with tying threads.

The inserts can be metallic or plastic, and the visual part of the insert can be various colored beads or crafted as the anterior of the food item the fly is mimicking. The threading tool may also be pushed through the tube, capturing the line and a piece of rubber filament in the process and as a result affixing the line to the tube. The two trailing rubber ends at the tail of the fly are pulled tight to snug the fly to the line and either cut off or left to mimic the tail of a nymph.

In a preferred embodiment, a traditional hook may be used with the inventive hookless fly. For example, a C-hook, which is well known in the art, may be used in addition to the hookless fly.

Figure 20:
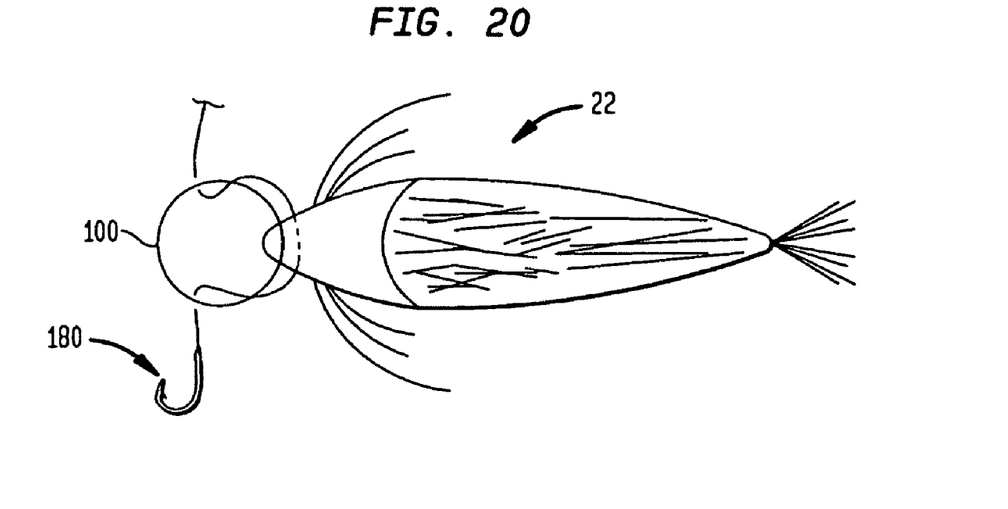
FIGS. 20 to 21 illustrate a nymph tied to a fly line in accordance with one aspect of the present invention.
Figure 21:
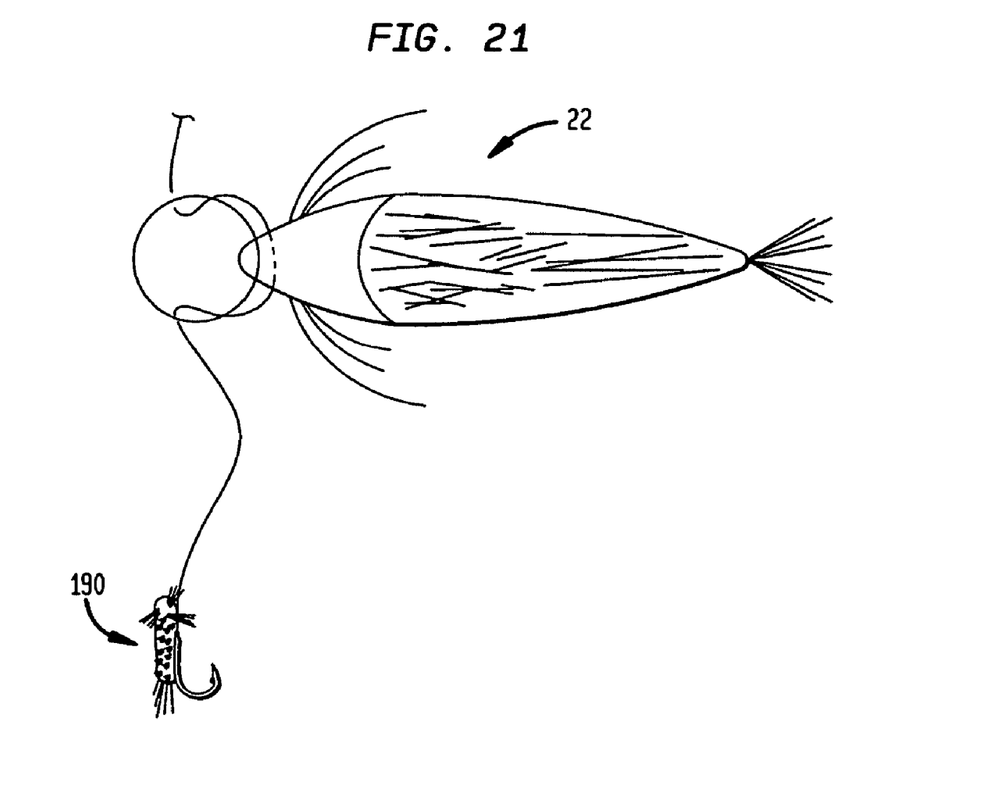

The inventive system allows traditional patterns to be fished with much smaller hooks. FIG. 20 shows a hookless fly with a hook near the main fly body. Pulling a small hook 180 tight to the eye 100 of the fly 22 completes the rig. FIG. 21 shows another embodiment with a small free-swinging fly. The rig can be fished with a small free-swinging fly 190 some distance from the hookless fly 22. The use of smaller hooks also allows advantageous use of lighter fly rods with large patterns and reduces injuries to fish.

Figure 22:
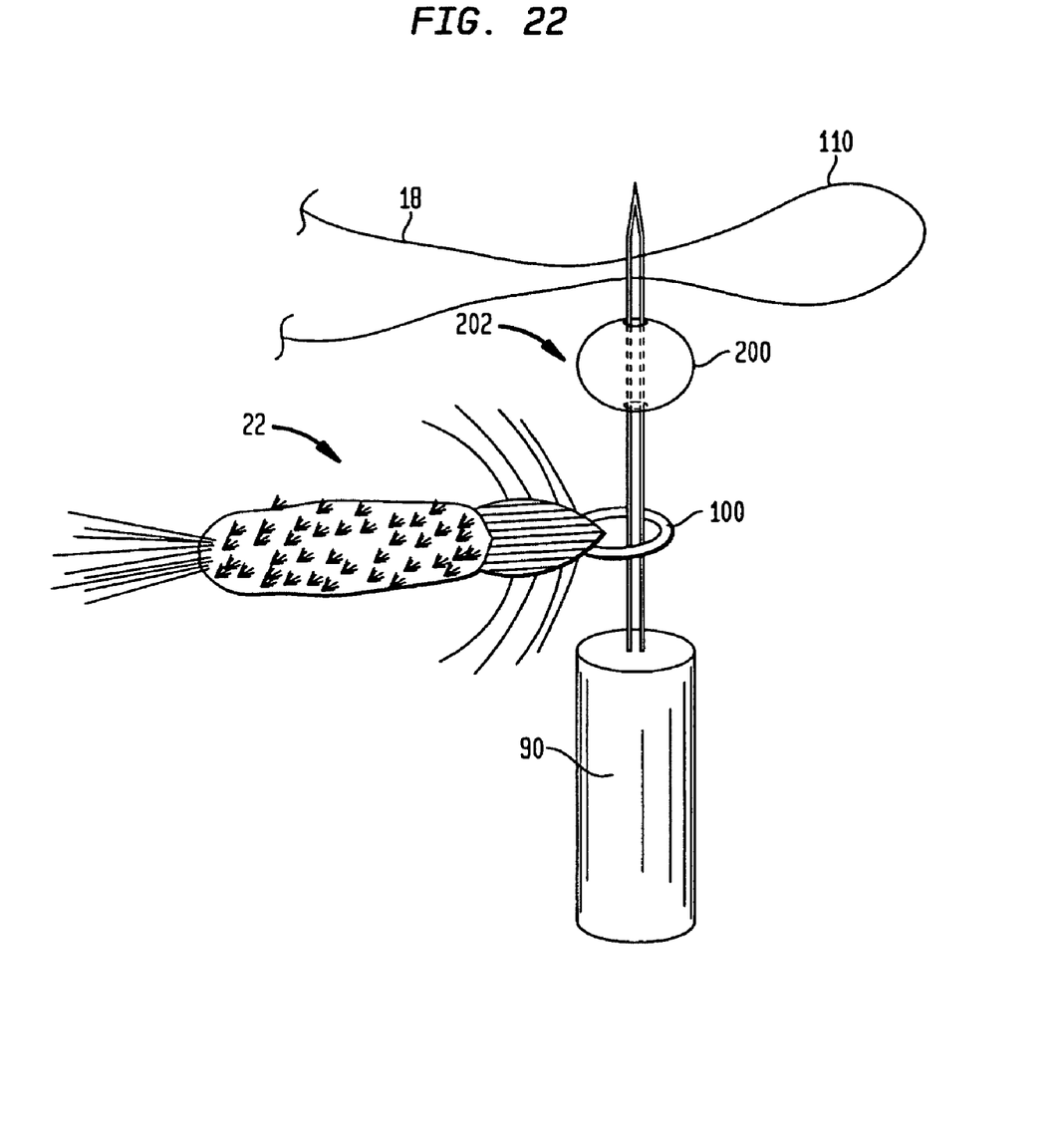
FIGS. 22 and 23 illustrate the addition of a bead to a hookless fly in accordance with one aspect of the present invention.
Figure 23:
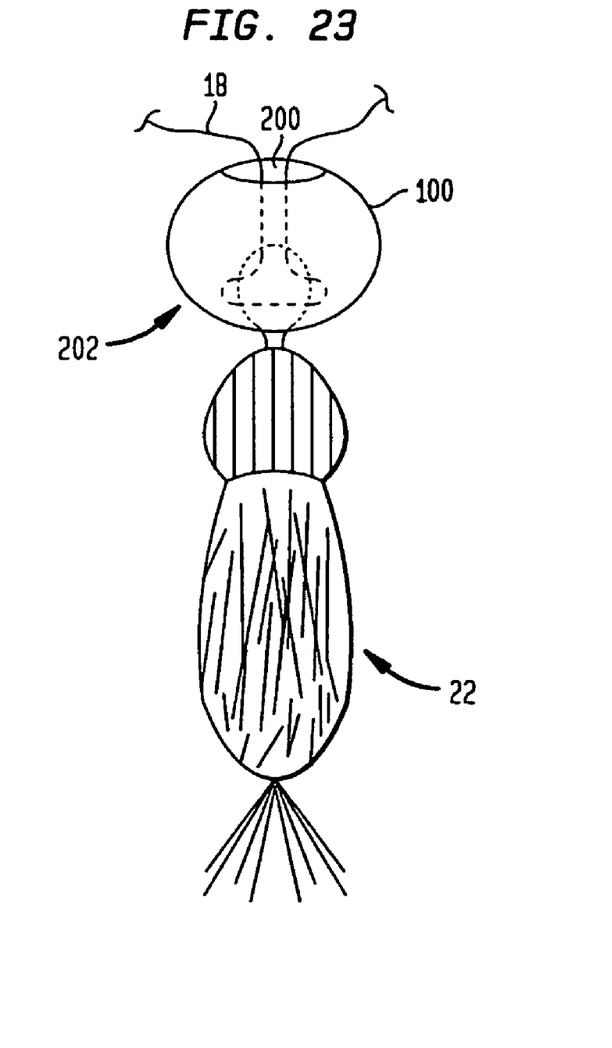

Advantageously, the inventive system also allows the angler to have one fly pattern and change beads or delete them at will, reducing the number of flies needed. FIG. 22 shows the construction of a hookless fly with a bead. Here, a bead fly is assembled by passing the threading tool 90 through the eye 100 of a hookless fly 22 and subsequently through the center hole 200 of as many beads 202 as desired. A loop 110 of fishing line 18 is made as before. FIG. 23 illustrates the completed fly with a single bead attached. The line 18 and fly's 22 eye 100 are contained within the center hole 200 of the bead 202.

Figure 24:
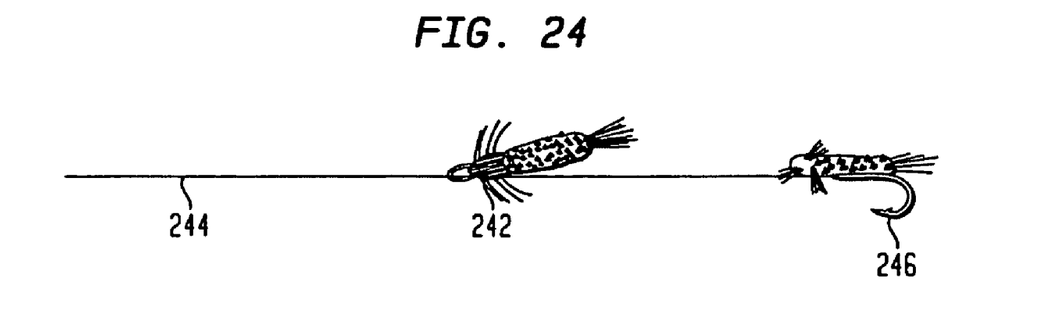
FIG. 24 illustrates a hookless midge fly and a traditional fly attached to a fly line.

In another embodiment of the present invention, a hookless midge fly 242, tied in accordance with the principles of the present invention, may be used as illustrated in FIG. 24. The term midge fly incorporates a variety of small flies, typically with hooks as small as #28. A mayfly is one example of a midge fly. The midge fly 242 is tied to the line 244, by any previously described method or any other known method, a suitable distance from a traditional fly 246. Alternatively, a plain hook can be used in place of the fly 246. Further, it is sometimes preferable to tie multiple midge flies on the line 244.

The apparatus and methods described herein are unique means for quickly and easily attaching or detaching hookless flies and lures to a fishing line. The invention allows attachment or detachment of lures from fishing lines without cutting or disconnecting the line, decreases the cost incurred since one does not have to purchase such a large array of flies, hooks, and fly accessories, overcomes the learned aversions of fish to hook shape and incorrect orientation of objects with respect to the water current, as well as longer retention time of the fly by the fish, leading to greater strike detection and hook setting.

The flies assume more natural shapes than hooked flies, better mimic natural food movement on the water, and improve incorrect buoyancy properties (relative to natural food) of the flies. False strikes by an angler are reduced, which increases the time the fly is properly presented; the mortality rate of released fish is decreased through use of smaller terminal hooks; and changing from various weighted to non-weighted flies is simple and fast.

Although the invention herein has been described with reference to particular embodiments, it is to be understood that these embodiments are merely illustrative of the principles and applications of the present invention. It will be apparent to those skilled in the art that various modifications and variations can be made in the apparatus and methods of the present invention without departing from the spirit and scope of the invention. Thus, it is intended that the present invention include modifications and variations that are within the scope of the appended claims and their equivalents.

The invention claimed is:

1. A hookless fly, comprising:
   a molded preformed core forming a structural base, the molded preformed core having no metal;
   one or more materials tied around the core to craft an artificial fly having a fly pattern; and
   an eye extending from the core;
   wherein the molded preformed core, the one or more materials and the hookless fly do not include a hook.

2. The hookless fly as claimed in claim 1, wherein the eye is integral to the molded preformed core.

3. The hookless fly as claimed in claim 1, wherein the eye and the molded preformed core are separate components that are attached.

4. The hookless fly as claimed in claim 1, whereby the fly is held in place on a fishing line by friction.

5. The hookless fly as claimed in claim 1, whereby the fly can be moved along a fishing line without disconnecting the fishing line from the fly.

6. The hookless fly as claimed in claim 1, whereby the fly can be removed from a fishing line without breaking the fishing line.

7. A method of making a hookless fly, comprising:
   providing a molded preformed core to form a structural base, the molded preformed core having no metal and no hook; and
   tying one or more materials tied around the core to craft the hookless fly having a fly pattern; and
   securing the one or more materials to the core.

8. The method of claim 7, comprising securing an eye to the molded preformed core.

\* \* \* \* \*